United States Patent
Xie

(10) Patent No.: US 9,372,635 B2
(45) Date of Patent: Jun. 21, 2016

(54) METHODS AND APPARATUS FOR DIVIDING SECONDARY STORAGE

(71) Applicant: ATI TECHNOLOGIES ULC, Markham (CA)

(72) Inventor: Bin Xie, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 98 days.

(21) Appl. No.: 14/294,211

(22) Filed: Jun. 3, 2014

(65) Prior Publication Data

US 2015/0347050 A1 Dec. 3, 2015

(51) Int. Cl.
G06F 3/06 (2006.01)

(52) U.S. Cl.
CPC ............ *G06F 3/0622* (2013.01); *G06F 3/0644* (2013.01); *G06F 3/0658* (2013.01); *G06F 3/0664* (2013.01); *G06F 3/0683* (2013.01)

(58) Field of Classification Search
CPC ... G06F 3/0622; G06F 3/0644; G06F 3/0658; G06F 3/0664; G06F 3/0683
USPC ......... 711/163, 156, 158, 206, 221; 726/2, 27
See application file for complete search history.

(56) References Cited

U.S. PATENT DOCUMENTS

| | | | | |
|---|---|---|---|---|
| 7,076,649 B2 * | 7/2006 | Hagiwara | ............. | G06F 3/0614 713/100 |
| 7,165,157 B2 * | 1/2007 | Eguchi | .................. | G06F 3/0622 707/999.202 |
| 7,447,859 B2 * | 11/2008 | Eguchi | .................. | G06F 3/0622 707/999.202 |
| 7,487,367 B2 * | 2/2009 | Belnet | ................. | G06F 12/1491 711/152 |
| 7,610,464 B2 * | 10/2009 | Otsuka | ................ | G06F 12/0804 711/163 |
| 7,849,281 B2 * | 12/2010 | Malhotra | .............. | G06F 3/0605 711/163 |
| 8,402,135 B2 * | 3/2013 | Kondo | ................ | H04L 12/2807 348/552 |
| 8,522,308 B2 * | 8/2013 | Stinson, III | ............. | G06F 3/011 713/186 |
| 8,533,426 B2 * | 9/2013 | Otsuka | ................ | G06F 12/0804 711/202 |
| 9,015,444 B2 * | 4/2015 | Maeda | .................. | G06F 3/0611 711/171 |
| 9,032,164 B2 * | 5/2015 | Rupanagunta | ........ | G06F 3/0613 711/154 |
| 9,043,607 B2 * | 5/2015 | Stinson, III | ............. | G06F 3/011 713/186 |
| 2003/0159058 A1 * | 8/2003 | Eguchi | .................. | G06F 3/0622 713/193 |
| 2007/0180274 A1 * | 8/2007 | Eguchi | .................. | G06F 3/0622 713/193 |

(Continued)

*Primary Examiner* — Stephen Elmore
(74) *Attorney, Agent, or Firm* — Faegre Baker Daniels LLP

(57) ABSTRACT

Methods and apparatus for restricting access by one or more processors to an area of a secondary storage unit are presented herein. The methods and apparatus may comprise an independent programmable storage controller logic that divides a storage area of the secondary storage unit into at least a first area and a second area and controls usage of the areas as at least two virtual secondary storage units such that the processor(s) access the at least two virtual secondary storage units as if accessing at least two physical secondary storage units by selecting one of the at least two virtual secondary storage units as an active virtual secondary storage unit to provide the processor(s) access to the active virtual secondary storage unit based on a secondary storage unit configuration. Each virtual secondary storage unit may contain at least one region of which an access permission setting is modifiable.

28 Claims, 8 Drawing Sheets

(56) References Cited

U.S. PATENT DOCUMENTS

| | | | | |
|---|---|---|---|---|
| 2007/0233985 | A1* | 10/2007 | Malhotra | G06F 3/0605 711/163 |
| 2007/0239944 | A1* | 10/2007 | Rupanagunta | G06F 3/0613 711/147 |
| 2011/0197263 | A1* | 8/2011 | Stinson, III | G06F 3/011 726/4 |
| 2011/0289294 | A1* | 11/2011 | Maeda | G06F 21/74 711/163 |
| 2011/0314241 | A1* | 12/2011 | Yamamizu | G03G 15/5016 711/162 |
| 2012/0131301 | A1* | 5/2012 | Maeda | G06F 3/0611 711/171 |
| 2013/0167206 | A1* | 6/2013 | Hiroki | G06F 3/0604 726/4 |
| 2013/0179530 | A1* | 7/2013 | Nomura | G06F 15/17331 709/213 |
| 2013/0305006 | A1* | 11/2013 | Altman | G06F 3/0622 711/163 |
| 2013/0339869 | A1* | 12/2013 | Stinson, III | G06F 3/011 715/741 |
| 2014/0215573 | A1* | 7/2014 | Cepuran | G06F 21/6218 726/4 |

* cited by examiner

CONFIGURATION USER INTERFACE    500

502 — HOW MANY AREAS DO YOU WANT TO SET UP?
<2>

504 — WHICH AREA DO YOU WANT TO SET UP?
<1>

506 — HOW MANY REGIONS DO YOU WANT TO SET UP?
<3>

508 — ENTER BLK ADDR, SIZE, PERMISSION, AND ACTUAL ADDR FOR REGION 1.
<0,1000,RW,4000>

510 — ENTER BLK ADDR, SIZE, PERMISSION, AND ACTUAL ADDR FOR REGION 2.
<1000,100,R,5000>

512 — ENTER BLK ADDR, SIZE, PERMISSION, AND ACTUAL ADDR FOR REGION 3.
<1100,50,NA,5100>

514 — WHICH AREA DO YOU WANT TO SET UP?
<2>

516 — HOW MANY REGIONS DO YOU WANT TO SET UP?
<3>

518 — ENTER BLK ADDR, SIZE, PERMISSION, AND ACTUAL ADDR FOR REGION 1.
<0,1000,RW,6000>

520 — ENTER BLK ADDR, SIZE, PERMISSION, AND ACTUAL ADDR FOR REGION 2.
<1000,100,R,7000>

522 — ENTER BLK ADDR, SIZE, PERMISSION, AND ACTUAL ADDR FOR REGION 3.
<1100,50,NA,7100>

FIG. 5

METHODS AND APPARATUS FOR DIVIDING SECONDARY STORAGE

FIELD OF THE DISCLOSURE

The disclosure relates generally to secondary storage and more particularly to secondary storage virtualization.

BACKGROUND

Computer storage is often classified as either primary or secondary. Primary storage refers to volatile memory into which instructions and other data may be loaded for subsequent execution or processing. For example, in a personal computer (PC), instructions and other data are stored in primary storage for quick access by the computer's central processing unit (CPU). Because of the volatile nature of primary storage, instructions and other data are lost when the power supply to the PC is removed. An example of primary storage is random access memory (RAM). Secondary storage refers to non-volatile memory, which is used to store information for extended periods. For example, a computer user may desire to keep pictures and videos permanently, which is possible with secondary storage by taking advantage of the non-volatile nature that allows data to remain even when the power supply is removed. Typical examples of secondary storage include flash memory, hard disk drives (HDD), and solid state drives (SSD).

A host processor, such as a CPU, has access to both types of computer storage. However, since there is no mechanism to restrict the CPU from accessing certain areas of secondary storage, viruses, spyware, or other malicious programs may corrupt the CPU into accessing data stored in secondary storage without a computer user's permission or intention, and thereby corrupt data that may be important for the computer user or operation of the computer. For example, since the CPU typically loads an operating system from secondary storage, the virus may corrupt critical files to boot the operating system, thereby preventing the operating system to start. The virus may also corrupt recovery files pre-installed by the manufacturer of the computer, thereby preventing a computer user from reformatting the computer to initial factory settings. The virus may further corrupt sensitive data, such as tax documents, or pictures and video data, and may render such data inaccessible by the computer user.

Some solutions exist to minimize the chances for viruses or spyware from accessing secondary storage. For example, many computer users find it useful to partition secondary storage using a user interface within an operating system and may separately store sensitive data on one partition and non-sensitive data on another. As another example, many computer users may want to install one operating system on one partition and either a different version of the operating system or a different operating system on the other partition in order to associate virus-prone activity on one partition and not the other partition. However, the CPU still has access to all of the partitions in secondary storage, and thus the CPU may allow a virus to read, alter, or destroy data within the partitions. Even using the Basic Input/Output System (BIOS) to partition secondary storage cannot prevent the spread of viruses since the BIOS may be manipulated to maliciously affect the CPU, which in turn affects data stored in all partitions in secondary storage.

Computer users may also use additional computers and designate such for secure secondary storage purposes. For example, one computer may be designated for web browsing, and another computer may be designated for storing sensitive data. However, using additional computers can be costly and inconvenient for the computer user, and still does not restrict the CPU of each computer from accessing secondary storage.

Other users may find using virtual machines useful. A virtual machine is a software-based solution that can provide several isolated computing environments. If a computer user installs virtual machine software on a host PC, several guest operating systems can be accessed, via the several isolated computing environments, through the host operating system running on the host PC. Each operating system can access logical addresses of secondary storage physically installed in the host PC, and the isolated nature of each computing environment may ensure that applications running within an operating system cannot interfere with other operating systems running on the host PC. This may appear to protect designated logical addresses of secondary storage from viruses. However, a virtual machine on the host PC may still be vulnerable to viruses, and may provide viruses access to all computing environments associated with the virtual machine, and thus to all logical addresses of secondary storage associated with each computing environment. In addition, running a virtual machine on the host PC that provides several isolated computing environments may require more CPU processing power than a host PC not running a virtual machine. Further, the concept or usage of virtual machines may deter an ordinary computer user from adopting virtual machine software.

Thus, there is a need for a simpler and more powerful hardware-based apparatus independent of the CPU and a method thereof that configures secondary storage into at least two virtual areas such that the CPU accesses the at least two virtual areas as if accessing at least two physical secondary storage units and that also prevents the CPU from accessing all regions of each virtual area unless given proper permissions.

BRIEF DESCRIPTION OF THE DRAWINGS

The embodiments will be more readily understood in view of the following description when accompanied by the below figures and wherein like reference numerals represent like elements, wherein:

FIG. 5 is a diagram illustrating an example of a configuration user interface;

DETAILED DESCRIPTION OF THE PREFERRED EMBODIMENTS

Figure 1:
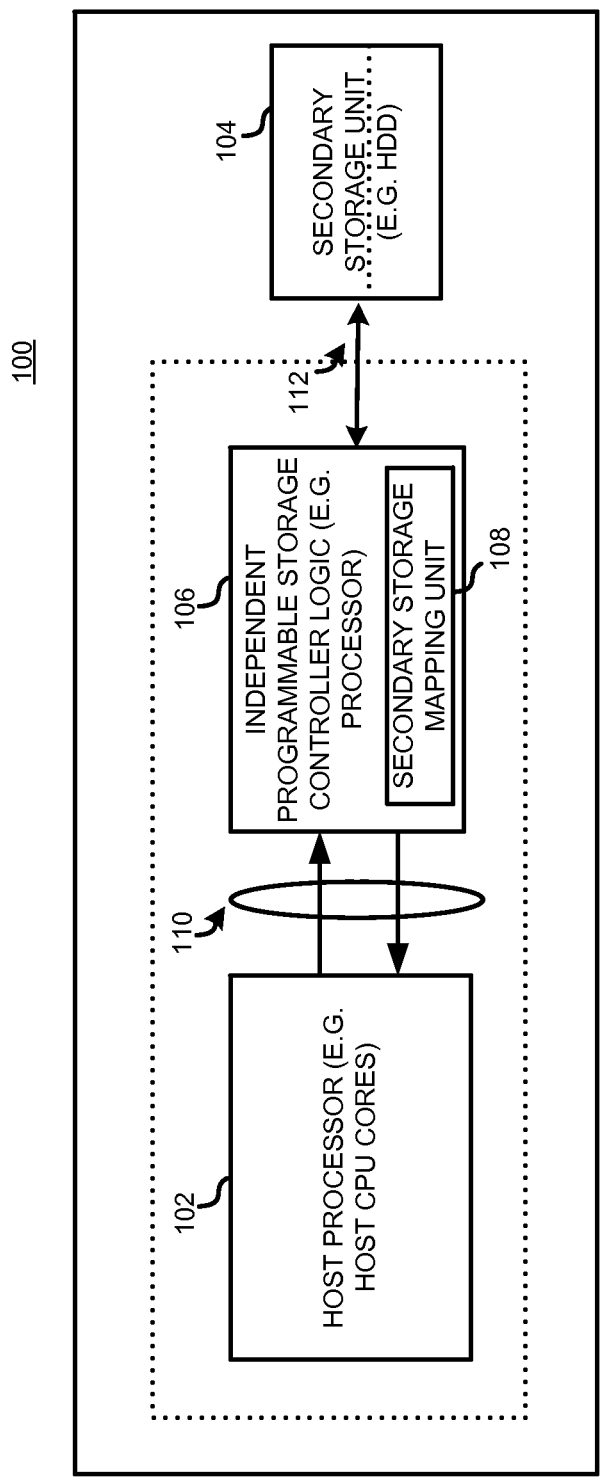
FIG. 1 is a block diagram illustrating one example employing an independent programmable storage controller logic interposed between one or more processors and a secondary storage unit.

Briefly, an apparatus and method for restricting access by one or more processors to an area of a secondary storage unit is disclosed. The apparatus and method include dividing, by independent programmable storage controller logic interposed between the one or more processors and the secondary storage unit, a storage area of the secondary storage unit into at least a first area and a second area. The apparatus and method further include controlling usage of at least the first area and the second area as at least two virtual secondary storage units such that the one or more processors access the at least two virtual secondary storage units as if accessing at least two physical secondary storage units by selecting one of the at least two virtual secondary storage units as an active virtual secondary storage unit to provide the one or more processors access to the active virtual secondary storage unit based on a secondary storage unit configuration. Each virtual secondary storage unit preferably contains at least one region of which an access permission setting is modifiable. Each region may contain a plurality of sectors. If a virtual secondary storage unit contains more than one region, the regions may be distinct, containing non-shared sectors, or the regions may overlap, containing shared sectors with another virtual secondary storage unit. The independent programmable storage controller logic contains its own closed firmware and read-only software pre-installed by its manufacturer to prevent a virus from corrupting the independent programmable storage controller logic.

The secondary storage device includes at least one region of which an access permission setting is modifiable. For example, the manufacturer may modify an access permission setting of a region within the one area of the secondary storage device and store the access permission setting in a mapping table within the independent programmable storage controller logic. For instance, after allocating a recovery package for the user to revert a computer back to factory settings into a region, the manufacturer may modify the access permission setting of the region from read-write to read-only to prevent a virus from corrupting the recovery package. An input mechanism, such as a switch, may be coupled to the independent programmable storage controller logic, to provide a means for a user to switch between one area of a secondary storage device to another area of the secondary storage device. In this embodiment, the manufacturer pre-configures at least two areas of the secondary storage device and the regions within the two areas, thus limiting an ordinary user to use its pre-configured settings.

The apparatus and method for restricting access by one or more processors to an area of a secondary storage unit further comprises receiving a configuration input corresponding to the secondary storage unit configuration and dividing the storage area of the secondary storage unit into the at least the first area and the second area using the configuration input. For example, a computer user may configure at least two areas of the secondary storage device and the regions within the two areas via a configuration user interface coupled to the independent programmable storage controller logic. The user may modify an access permission setting of at least one region within each area of the secondary storage device. For instance, the user may desire two areas to install two operating systems, and within each area may desire a plurality of regions having various access permission settings, such as read, read-only, and no access. An input mechanism, such as a switch, is coupled to the independent programmable storage controller logic, and provides a means for a user to switch between one area of a secondary storage device to another area of the secondary storage device. The switch may also provide a means for a user to switch between one region of an area to another region of the area. This embodiment may appeal to savvier computer users who desire to customize their secondary storage device.

Among other advantages, the mechanism to configure a secondary storage unit into areas and to modify access permission settings for regions within the areas can be employed that prevents the host processor, such as the CPU, from accessing the entire secondary storage unit unless given proper permissions. By introducing the independent programmable storage controller logic with its own closed firmware and software coupled between the CPU and secondary storage to set and map access permission settings within secondary storage, viruses may not access particular regions of the secondary storage unit. Other advantages will be recognized by those of ordinary skill in the art.

The apparatus 100 may comprise any suitable device, for example, a laptop computer, a desktop computer, a server, or any such device that makes use of secondary storage or any other suitable device. It is understood that any other suitable component may also be included in the apparatus 100. The host processor 102 and the independent programmable storage controller logic 106 each may include one or more processors that may be a host central processing unit (CPU) having one or multiple cores, a discrete graphic processing unit (GPU), an integrated GPU, a general processor (e.g., APU, accelerated processing unit, GPGPU, general-purpose computing on GPU), or any suitable combination thereof or any other suitable processor. The secondary storage unit 104 may include hard disk drives (HDD), solid state drives (SSD), flash memory, or any other suitable memory devices. The secondary storage unit 104 may be a fixed or removable storage medium.

FIG. 1 is a block diagram illustrating one example employing an independent programmable storage controller logic interposed between one or more processors and a secondary storage unit. Particularly, FIG. 1 illustrates one example of the apparatus 100 including a host processor 102, a secondary storage unit 104, and the independent programmable storage controller logic 106 interposed between the host processor 102 and the secondary storage unit 104. The host processor 102, the independent programmable storage controller logic 106, and the secondary storage unit 104 may, in the various embodiments, be implemented in various ways. For example, the host processor 102 and the independent programmable storage controller logic 106 may include one or more processing cores and be physically located on separate integrated circuits and on separate printed circuit boards. In some embodiments, the host processor 102 and the independent programmable storage controller logic 106 are integrated circuits integrated on a single integrated circuit die. In other embodiments, the independent programmable storage controller logic 106 is located on the secondary storage unit 104. The independent programmable storage controller logic 106 includes a secondary storage mapping unit 108 that stores mapping logic and handles mapping information that determines a configuration scheme for the secondary storage unit 104, as well as various levels of access between the host processor 102 and the secondary storage unit 104.

The host processor 102 provides an access request signal in the form of a block address to the secondary storage unit via one or more suitable communication links 110 such as buses or any other suitable links. The independent programmable storage controller logic 106 intercepts the access request signal, and looks up the block address in the secondary storage mapping unit 108. The independent programmable storage controller logic 106 subsequently provides an actual address corresponding to the block address to the secondary storage unit, if the host processor 102 has been granted access to the secondary storage unit. If access has been granted, the host processor 102 receives response data via interface 110. The independent programmable storage controller logic 106 may provide the actual address in the response data. The independent programmable storage controller logic 106 receives data via interface 112 as known by one of ordinary skill in the art. For example, various interfaces may be used, such as Serial Advance Technology Attachment (SATA), Serial Attached Small Computer System Interface (SAS), Enhanced Integrated Drive Electronics (EIDE), or any other suitable interfaces.

Figure 2:
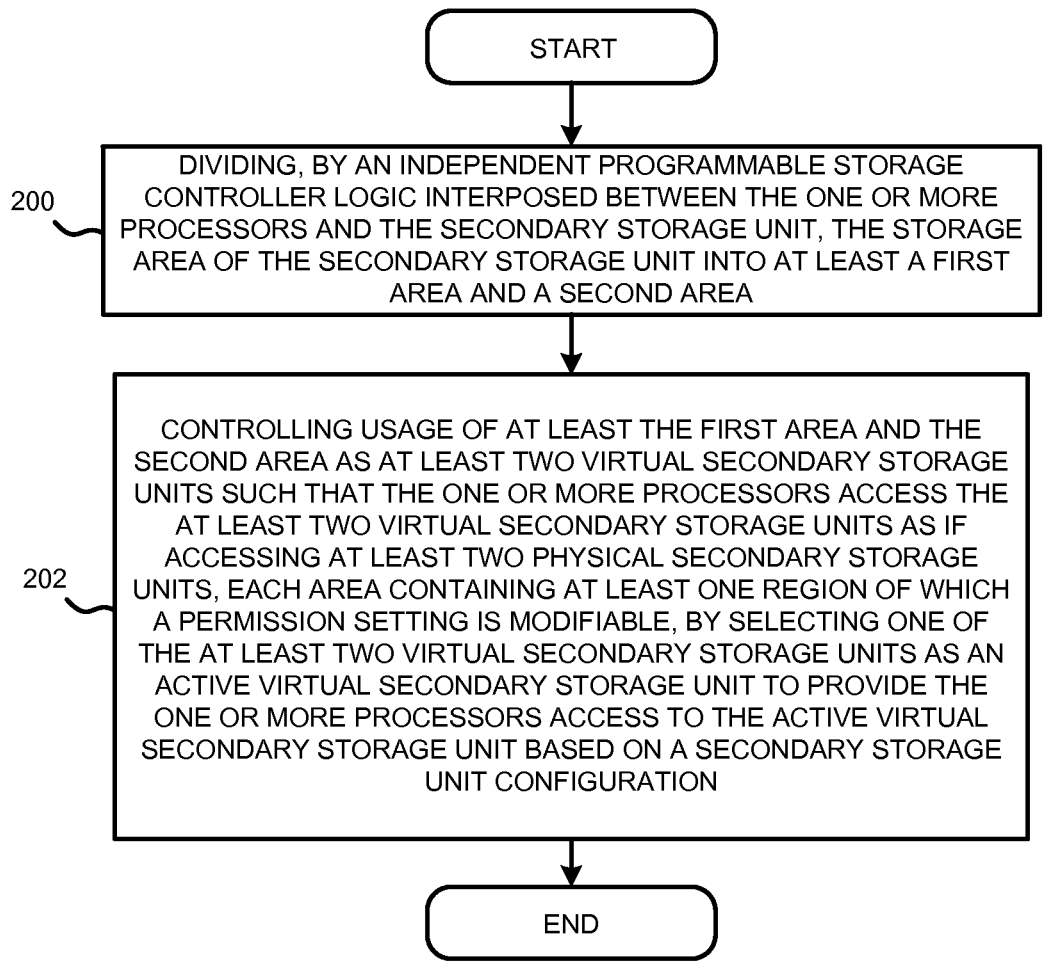
FIG. 2 is a flowchart generally illustrating an example of a method of dividing and configuring secondary storage unit based on access permission settings to prevent unauthorized access to the secondary storage unit.

FIG. 2 is a flowchart generally illustrating an example of a method of dividing and configuring secondary storage unit based on access permission settings to prevent unauthorized access to a secondary storage unit. Particularly, FIG. 2 illustrates one example of a method of operation of apparatus 100, which may be performed by any suitable executing software module, hardware, executing firmware or any suitable combination thereof, such as programmed processors, discrete logic, for example, state machine, to name a few. As shown in block 200, the method includes dividing, by the independent programmable storage controller logic 106 interposed between the host processor 102 and the secondary storage unit 104, the secondary storage unit 104's storage area into at least a first area and a second area. The method, as shown in block 202, also includes controlling usage of at least the first area and second area as at least two virtual secondary storage units such that the host processor 102 accesses the at least two virtual secondary storage units as if accessing at least two physical secondary storage units, each area containing at least one region of which an access permission setting is modifiable, by selecting one of the at least two virtual secondary storage units as an active virtual secondary storage unit to provide the host processor 102 access to the active virtual secondary storage unit based on a secondary storage unit configuration. This may be done by either the manufacturer via its own pre-configuration process, or by a computer user via a configuration user interface, or any suitable combination thereof or any other suitable process.

Figure 3:
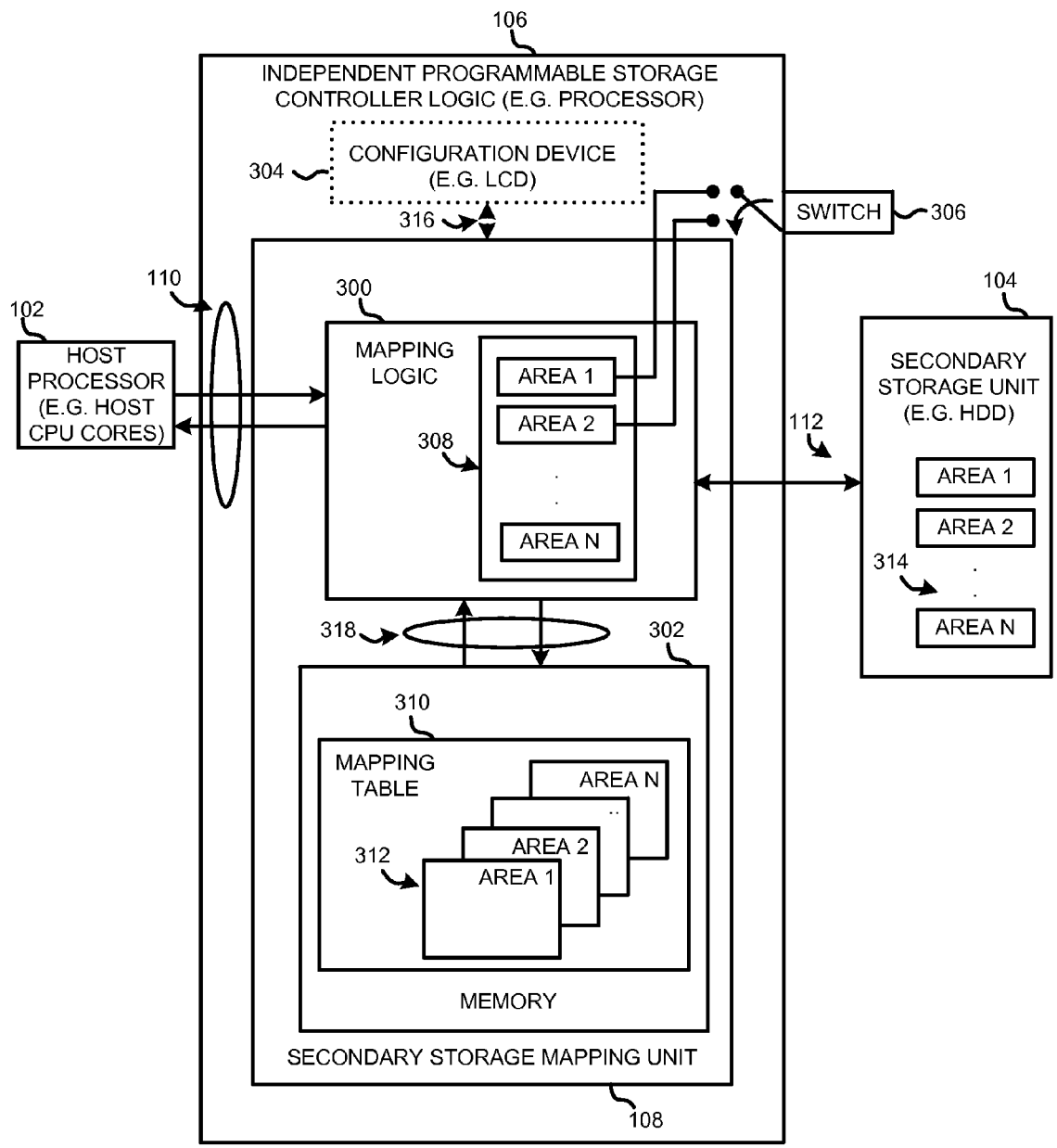
FIG. 3 is a block diagram illustrating one example of an independent programmable storage controller logic.

FIG. 3 is a block diagram illustrating one example of an independent programmable storage controller logic. In this example, the independent programmable storage controller logic 106 includes a switch 306 and the secondary storage mapping unit 108 that includes both mapping logic 300 and memory 302 that holds a mapping table 310. The independent programmable storage controller logic 106 additionally includes a configuration device 304, such as a liquid crystal display (LCD), and a mechanism to receive user input, such as a button, keypad, keyboard, or the like. When the manufacturer already has the secondary storage unit 104 pre-configured into at least two areas 314, the computer user may use the switch 306, which may be implemented by software or hardware, to switch among the pre-configured areas 308 defined by the manufacturer. Configuration properties of the pre-configured areas 308 are defined in a plurality of mapping tables 312 stored in memory 302. The host processor 102 may only have access to the selected active area of pre-configured areas 308 designated by the switch 306. For example, when the host processor 102 requests access, such as by transmitting a block address, to the secondary storage unit 104, mapping logic 300 performs a look up in a corresponding one of the plurality of mapping tables 312 pertaining to the selected active area of pre-configured areas 308 designated by the switch 306 via interface 318. For instance, if the selected active area of pre-configured areas 308 is Area 1, the corresponding one of the plurality of mapping tables 312 the mapping logic performs a lookup on is the mapping table designated as Area 1. If the block address does not appear in the one of the plurality of mapping tables 312, mapping logic 300 sends a signal to the host processor indicating denial of access to data. If the block address does appear in the one of the plurality of mapping tables 312, mapping logic 300 may either satisfy the access request by providing the actual address to the secondary storage unit or dummy data to the host processor indicating data is not ready in the actual address depending on the configuration properties of the pre-configured areas 308 defined by the manufacturer. If the configuration properties of the pre-configured areas 308 defined by the manufacturer indicate access to data, mapping logic 300 enables the interface 112.

Alternatively or additionally, when the computer user desires to configure the secondary storage unit 104 manually, the computer user may use the switch 306, which may be implemented by software or hardware, to switch among the areas 308 defined by the computer user via a configuration user interface displayed on a configuration device 304, such as the LCD, linked to the secondary storage mapping unit 108 via interface 316. Similar to the example described above, configuration properties of the user-defined areas 308 are further defined in the plurality of mapping tables 312 stored in memory 302. The host processor 102 may only have access to the selected active area of areas 308 designated by the switch. Interfaces 316 and 318 may be any suitable communication links such as buses or any other suitable links. Memory 302 may be any suitable non-volatile memory such as read-only memory, flash memory, erasable programmable read-only memory (EPROM), electrically erasable programmable read-only memory (EEPROM), Flash ROM, or any other suitable memory.

Figure 4:
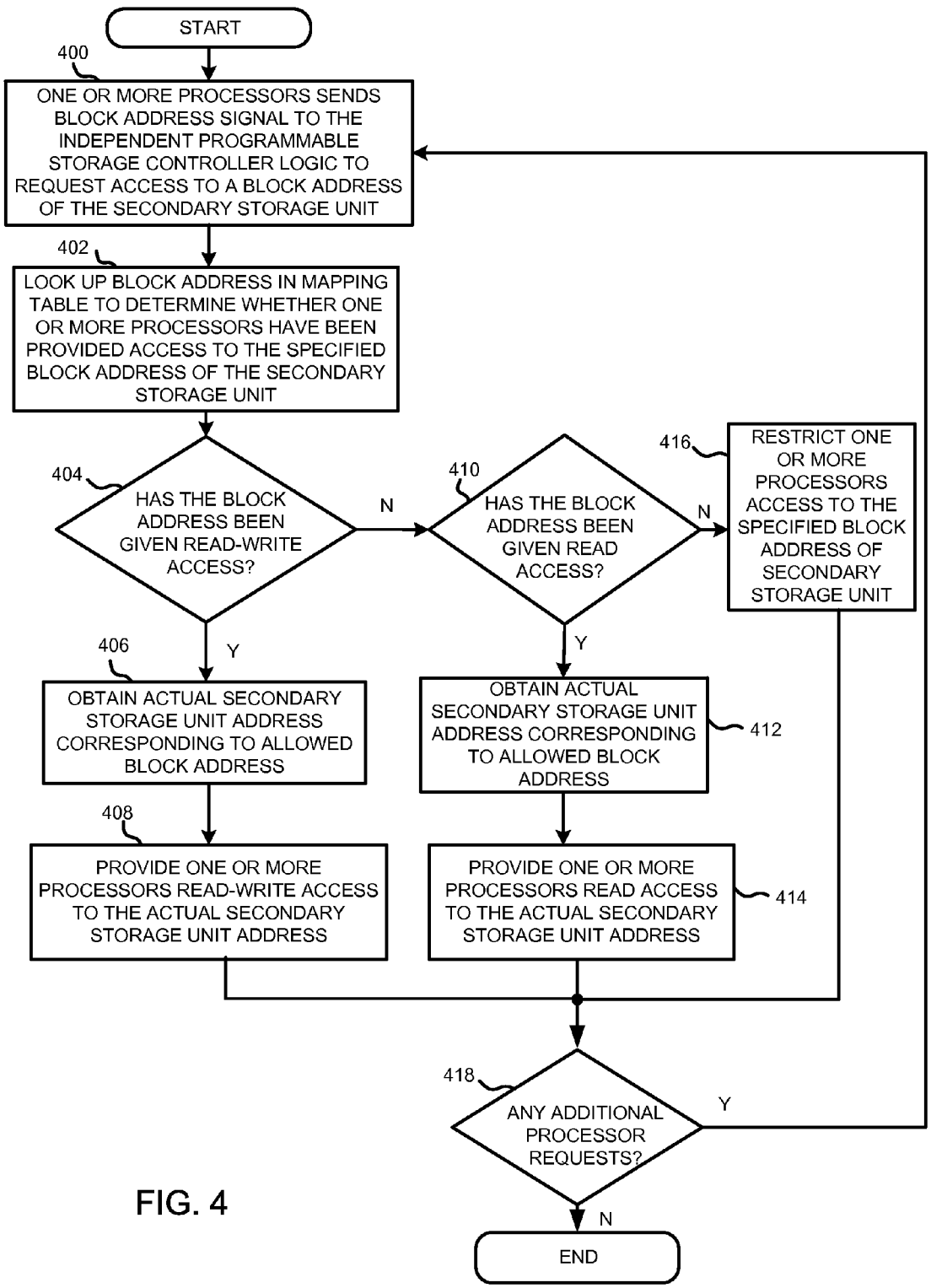
FIG. 4 is a flowchart illustrating, in more detail, an example of a method of allowing or restricting access to the secondary storage unit based on access permission settings.

FIG. 4 is a flowchart illustrating, in more detail, an example of a method of allowing or restricting access to the secondary storage unit based on access permission settings of apparatus 100. The method may be performed by any suitable executing software module, hardware, executing firmware or any suitable combination thereof, such as programmed processors, discrete logic, for example, state machine, to name a few. As shown in block 400, the method includes the host processor 102 sending a block address signal to the independent programmable storage controller logic 106 to request access to a block address of the secondary storage unit 104. As shown in block 402, a look up of the block address in one of the plurality of mapping tables 312 determines whether the host processor 102 has been provided access to the specified block address of the secondary storage unit 104. If the block address has been given read-write access, as determined in block 404, the independent programmable storage controller logic 106 obtains an actual secondary storage unit address corresponding to the allowed block address for read-write access and provides the secondary storage unit the actual secondary storage unit address for read-write access, as determined in blocks 406 and 408 respectively. If the block address has been given read access, as determined in block 410, the independent programmable storage controller logic 106 obtains an actual secondary storage unit address corresponding to the allowed block address for read access and provides the secondary storage unit the actual secondary storage unit address for read access, as determined in blocks 412 and 414 respectively. If the block address has not been given read-write or read access, the independent programmable storage controller logic 106 restricts the one or more processors from having access to the specified block address of the secondary storage unit 104 by sending either a dummy response or a denial of access response, as indicated in block 416. If there are any additional requests following blocks 408, 414, and 416 as indicated in block 418, the process repeats from block 400. The process ends when there are no additional requests. The permissions, such as read-write access, read access, and no access, block addresses, and corresponding actual secondary storage unit addresses may be organized in a mapping table further described in FIG. 6.

Figure 6:
FIG. 6 is a diagram illustrating an example of a mapping table.

FIG. 5 is a diagram illustrating an example of a configuration user interface. The configuration user interface 500 is displayed on the configuration device 304, such as an LCD, and a computer user is provided a series of questions in order to determine a manner in which to configure the secondary storage unit 104. For example, the computer user may be asked how many areas are desired, as indicated by block 502. The computer user may desire to install two operating systems, and thus provide an input of "2." Subsequently, the computer user may be asked which area the computer user would like to configure, as indicated by block 504, and may provide an input of "1" to begin configuration of area 1. In this example, since the computer user provided an input of "2," valid options may be "1" or "2." Further, if the computer user desires three defined regions per area of the secondary storage unit to account for the operating system, recovery files to be able to reformat the computer to initial factory settings, and data-sensitive files such as tax files, he may enter a value of "3" when asked about the number of regions desired to be configured in area 1, as indicated by block 506. The configuration user interface then takes the user through a process in defining each region of each area, such as by requesting for a desired block address, size, affiliated access permission setting for region 1 for area 1, and the actual address corresponding to the desired block address, as indicated by block 508. This process is repeated until each region for area 1 has been configured, as indicated by block 510-512. After each region for area 1 has been configured, the computer user may be provided instructions to configure any remaining areas, such as area 2, as indicated by block 514. Similar to blocks 506-512, the computer user may define each region of area 2, as indicated by blocks 516-522. A mapping table 310 is updated to reflect the computer user's input, by mapping the block address and size to actual addresses with the affiliated access permission setting, as indicated in FIG. 6. Although FIG. 6 illustrates two separate mapping tables for the corresponding two areas, the manufacturer of the independent programmable storage controller logic 106 may consolidate the computer user's input using an appropriate organizational paradigm. The configuration user interface 500 of FIG. 5 has been described to facilitate understanding of the apparatus and method disclosed, and as such, illustrates one example of a series of questions presented to the computer user. Other information, such as desired size of area and error checking of computer user input may be implemented into the configuration user interface 500.

FIG. 6 is a diagram illustrating an example of a mapping table. Particularly, FIG. 6 provides an example in which the computer user has given the host processor 102 "read-write" access to the operating system, "read access" to the recovery files so that the files may not be accidentally deleted, and "no access" to the private data-sensitive files so that the files may not be viewed or deleted. If the switch 306 indicates Area 1 as the selected active area of areas 308 and the block address request from the host processor 102 is 0, the host processor 102 will receive read-write access to the actual addresses 4000-4999, which correspond to an operating system. Since only the corresponding mapping table for Area 1 is selected, the one or more processors will not receive access to the actual addresses 6000-6999 of the mapping table for Area 2, unless the computer user switches from Area 1 to Area 2 using the switch 306. Similarly, if the switch 306 indicates Area 1 as the selected active area of areas 308 and the block address request from the host processor 102 is 1000, the host processor 102 will receive read access to the actual addresses 5000-5099, which correspond to recovery files. Since only the corresponding mapping table 312 for Area 1 is selected, the host processor 102 will not receive access to the actual addresses 6000-6999 of the mapping table 312 for Area 2, unless the computer user switches from Area 1 to Area 2 using the switch 306. Similarly, if the switch 306 indicates Area 1 as the selected active area of areas 308 and the block address request from the host processor 102 is 1100, the host processor 102 will receive a dummy response to the actual addresses 5100-5149, which correspond to data-sensitive files. Since only the corresponding mapping table 312 for Area 1 is selected, the host processor 102 will not receive access to the actual addresses 7100-7149 of the mapping table 312 for Area 2, and still will receive a dummy response to the actual addresses 7100-7149 if the computer user switches from Area 1 to Area 2 since the corresponding permissions for the actual addresses 7100-7149 also restricts access. If the switch 306 indicates Area 1 as the selected active area of areas 308 and the block address request from the one or more processor is 1150 for example, the host processor 102 will not receive access, to distinguish from data not yet having been dynamically allocated to the specified block address.

Figure 7:
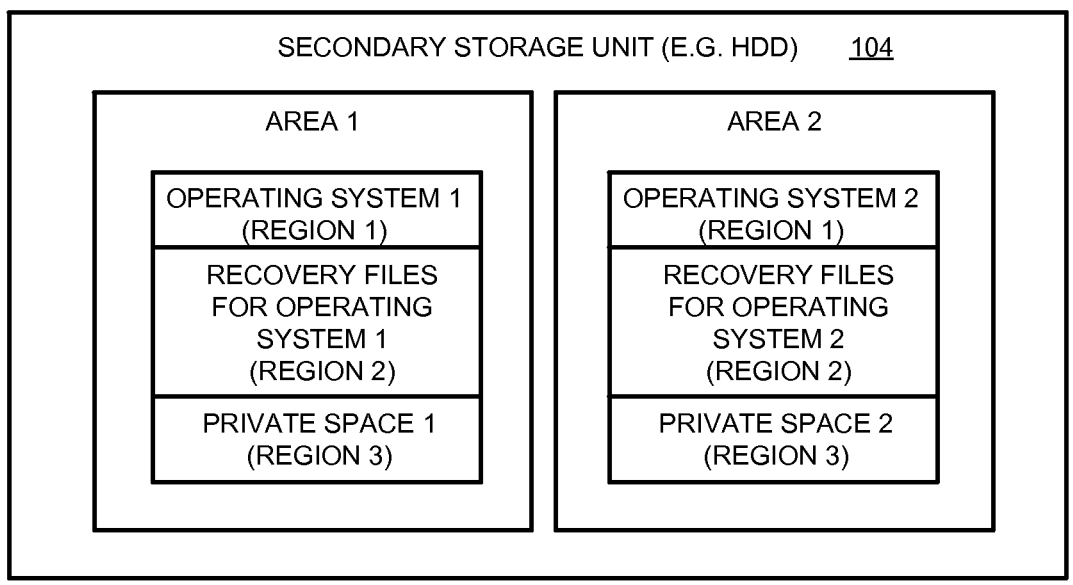
FIG. 7 is a diagram illustrating an example of a secondary storage unit.

FIG. 7 is a diagram illustrating an example of a secondary storage unit. Particularly, FIG. 7 further illustrates the secondary storage unit 104 divided into the two areas as indicated in FIG. 5, each area having three regions to account for different operating systems, recovery files, and data-sensitive files. Operating System 1 and Operating System 2 may have read-write permissions, and may be the same or different operating systems. Recovery files for Operating System 1 and Operating System 2 may have read-permissions so that the recovery files remain uncorrupted in order to revert the computer back to factory settings, and may be the same or different recovery files. Private space 1 and Private space 2 may have no access permissions so that data-sensitive files stored in these regions cannot be corrupted or even viewed. Each area may also have a region with read permission designated for boot codes to boot the operating systems.

Figure 8:
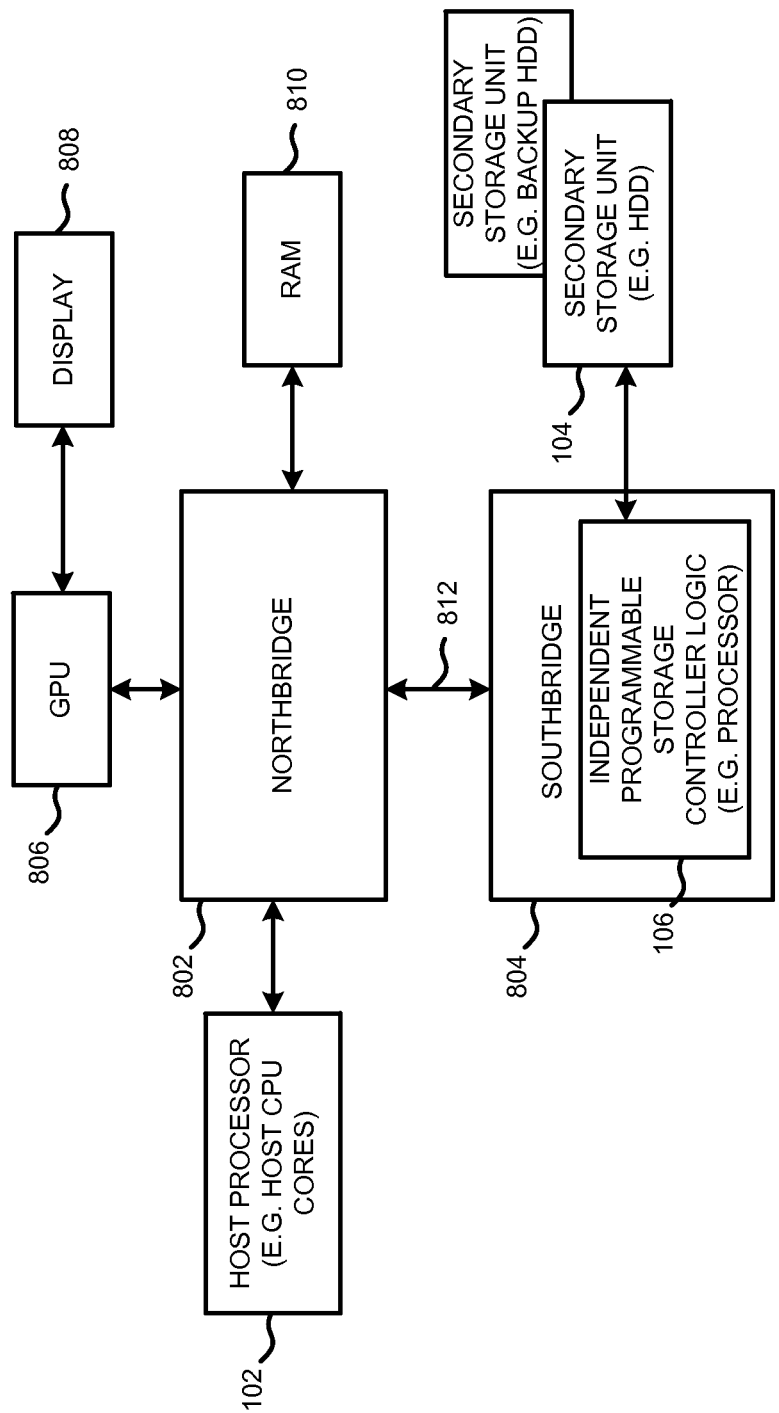
FIG. 8 is a block diagram of a chipset illustrating the location of the independent programmable storage controller logic.

FIG. 8 is a block diagram of a chipset illustrating the location of the independent programmable storage controller logic 106. The chipset includes a northbridge 802 and southbridge 804. The northbridge 802 handles communication among the host processor 102, GPU 806, read-access memory (RAM), a display 808, and the southbridge 804. The southbridge 804 handles communication among the secondary storage unit 104 and other peripheral devices. The display 808 is typically a computer monitor, which is preferably distinct from the configuration device 304 of FIG. 3. Preferably, the independent programmable storage controller logic 106 is located on the southbridge 804. Alternatively, the independent programmable storage controller logic 106 is located on the secondary storage unit 104 itself, or integrated on the same single integrated circuit die as the host processor 102. Communication paths interconnecting the various components in FIG. 1, such as path 812, may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In summary, persons of ordinary skill in the art will readily appreciate that methods and apparatus for restricting access by one or more processors to an area of a secondary storage unit have been provided. Among other advantages, the mechanism to configure a secondary storage unit into areas and to modify access permission settings for regions within the areas can be employed that prevents the host processor, such as the CPU, from accessing the entire secondary storage unit unless given proper permissions. By introducing the independent programmable storage controller logic with its own closed firmware and software coupled between the CPU and secondary storage to set and map access permission settings within secondary storage, viruses may not access particular regions of the secondary storage unit. Other advantages will be recognized by those of ordinary skill in the art.

The above detailed description of the embodiments and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for restricting access by one or more processors to a storage area of a secondary storage unit, comprising:
dividing, by an independent programmable storage controller logic interposed between the one or more processors and the secondary storage unit, the storage area of the secondary storage unit into at least a first area and a second area; and
controlling usage of at least the first area and the second area as at least two virtual secondary storage units such that the one or more processors access the at least two virtual secondary storage units as if accessing at least two physical secondary storage units, each area containing at least one region of which an access permission setting is modifiable, by selecting one of the at least two virtual secondary storage units as an active virtual secondary storage unit to provide the one or more processors access to the active virtual secondary storage unit based on a secondary storage unit configuration.

2. The method of claim 1, further comprising:
intercepting an access request from the one or more processors to the secondary storage unit; and
checking a mapping table corresponding to the active physical secondary storage unit to determine whether the one or more processors has been provided access to the at least one region contained in the active physical secondary storage unit.

3. The method of claim 1, further comprising:
receiving a configuration input corresponding to the secondary storage unit configuration; and
dividing the storage area of the secondary storage unit into the at least the first area and the second area using the configuration input.

4. The method of claim 1, wherein selecting one of the at least two virtual secondary storage units as the active virtual secondary storage unit comprises using one of a switch and a button.

5. The method of claim 2, wherein the access request from the one or more processors to the secondary storage unit comprises a block address of the secondary storage unit.

6. The method of claim 2, further comprising:
providing the one or more processors access to the at least one region in response to determining that the access permission setting to the at least one region has been granted.

7. The method of claim 2, further comprising:
restricting the one or more processors from accessing the at least one region in response to determining that the access permission setting to the at least one region has been denied.

8. The method of claim 3, further comprising:
dividing each of the at least the first area and the second area into the at least one region using the configuration input,
wherein the configuration input modifies the access permission setting of the at least one region.

9. The method of claim 3, wherein receiving the configuration input corresponding to the secondary storage unit configuration and dividing the storage area of the secondary storage unit into the at least the first area and the second area using the configuration input comprises using a display and one of a switch and a button.

10. The method of claim 6, wherein providing the one or more processors access to the at least one region in response to determining that the access permission setting to the at least one region has been granted comprises providing at least one actual address of the at least one region corresponding to the block address requested by the one or more processors to the secondary storage unit.

11. The method of claim 7, wherein restricting the one or more processors from accessing the at least one region in response to determining that the access permission setting to the at least one region has been denied comprises providing at least one of a dummy response and a denial of access response to the one or more processors,
wherein the dummy response indicates that data has not yet been dynamically allocated to the at least one region, and
wherein the denial of access response indicates that data allocated to the at least one region cannot be accessed by the one or more processors.

12. An apparatus for restricting access by one or more processors to a storage area of a secondary storage unit, comprising:
an independent programmable storage controller logic, interposed between the one or more processors and the secondary storage unit, operative to:
divide the storage area of the secondary storage unit into at least a first area and a second area; and
control usage of at least the first area and the second area as at least two virtual secondary storage units such that the one or more processors access the at least two virtual secondary storage units as if accessing at least two physical secondary storage units, each area containing at least one region of which an access permission setting is modifiable, by selecting one of the at least two virtual secondary storage units as an active virtual secondary storage unit to provide the one or more processors access to the active virtual secondary storage unit based on a secondary storage unit configuration.

13. The apparatus of claim 12, wherein the independent programmable storage controller logic is further operable to:
intercept an access request from the one or more processors to the secondary storage unit; and
check a mapping table corresponding to the active physical secondary storage unit to determine whether the one or more processors has been provided access to the at least one region contained in the active physical secondary storage unit.

14. The apparatus of claim 12, wherein the independent programmable storage controller logic is further operable to:

receive a configuration input corresponding to the secondary storage unit configuration; and divide the storage area of the secondary storage unit into the at least the first area and the second area using the configuration input.

15. The apparatus of claim 12, wherein the independent programmable storage controller logic selects one of the at least two virtual secondary storage units as an active virtual secondary storage unit with one of a switch and a button.

16. The apparatus of claim 13, wherein the access request from the one or more processors to the secondary storage unit comprises a block address of the secondary storage unit.

17. The apparatus of claim 13, wherein the independent programmable storage controller logic is further operable to:

provide the one or more processors access to the at least one region in response to determining that the access permission setting to the at least one region has been granted.

18. The apparatus of claim 13, wherein the independent programmable storage controller logic is further operable to:

restrict the one or more processors from accessing the at least one region in response to determining that the access permission setting to the at least one region has been denied.

19. The apparatus of claim 14, wherein the independent programmable storage controller logic is further operable to:

divide each of the at least first area and second area into the at least one region using the configuration input, wherein the configuration input modifies the access permission setting of the at least one region.

20. The apparatus of claim 14, wherein the independent programmable storage controller logic receives the configuration input corresponding to the secondary storage unit configuration and divides the storage area of the secondary storage unit into the at least the first area and the second area by using a display and one of the switch and the button.

21. The apparatus of claim 17, providing the one or more processors access to the at least one region in response to determining that the access permission setting to the at least one region has been granted comprises providing at least one actual address of the at least one region corresponding to the block address requested by the one or more processors to the secondary storage unit.

22. The apparatus of claim 18, wherein restricting the one or more processors from accessing the at least one region in response to determining that the access permission setting to the at least one region has been denied comprises providing one of a dummy response and a denial of access response to the one or more processors, wherein the dummy response indicates that data has not yet been dynamically allocated to the at least one region, and wherein the denial of access response indicates that data allocated to the at least one region cannot be accessed by the one or more processors.

23. A non-transitory computer readable memory comprising:

executable instructions stored on the non-transitory computer readable memory for execution by an independent programmable storage controller logic interposed between one or more processors and a secondary storage unit, wherein the independent programmable storage controller logic, upon executing the executable instructions is operable to:

divide a storage area of the secondary storage unit into at least a first area and a second area; and control usage of at least the first area and the second area as at least two virtual secondary storage units such that the one or more processors access the at least two virtual secondary storage units as if accessing at least two physical secondary storage units, each area containing at least one region of which an access permission setting is modifiable, by selecting one of the at least two virtual secondary storage units as an active virtual secondary storage unit to provide the one or more processors access to the active virtual secondary storage unit based on a secondary storage unit configuration.

24. The non-transitory computer readable memory of claim 23, wherein the executable instructions, when executed further cause the independent programmable storage controller logic to:

intercept an access request from the one or more processors to the secondary storage unit; and check a mapping table corresponding to the active physical secondary storage unit to determine whether the one or more processors has been provided access to the at least one region contained in the active physical secondary storage unit.

25. The non-transitory computer readable memory of claim 23, wherein the executable instructions, when executed further cause the independent programmable storage controller logic to:

receive a configuration input corresponding to the secondary storage unit configuration; and divide the storage area of the secondary storage unit into the at least first area and the second area using the configuration input.

26. The non-transitory computer readable memory of claim 24, wherein the executable instructions, when executed further cause the independent programmable storage controller logic to:

provide the one or more processors access to the at least one region in response to determining that the access permission setting to the at least one region has been granted.

27. The non-transitory computer readable memory of claim 24, wherein the executable instructions, when executed further cause the independent programmable storage controller logic to:

restrict the one or more processors from accessing the at least one region in response to determining that the access permission setting to the at least one region has been denied.

28. The non-transitory computer readable memory of claim 25, wherein the executable instructions, when executed further cause the independent programmable storage controller logic to:

divide each of the at least the first area and the second area into the at least one region using the configuration input, wherein the configuration input modifies the access permission setting of the at least one region.

* * * * *